United States Patent [19]

Hoyt, III et al.

[11] Patent Number: 5,738,585
[45] Date of Patent: Apr. 14, 1998

[54] COMPACT FLEXIBLE COUPLINGS WITH INSIDE DIAMETER BELT SUPPORT AND LOCK-ON FEATURES

[76] Inventors: Raymond Earl Hoyt, III, 26602 Via Gaviota, Mission Viejo, Calif. 92691; Jerry L. Hauck, 504 Huval St., Broussard, La. 70518; Tom Artunian, 16291 Sundance La., Huntington Beach, Calif. 92649

[21] Appl. No.: 695,675

[22] Filed: Aug. 8, 1996

Related U.S. Application Data

[63] Continuation of Ser. No. 340,528, Nov. 16, 1994, abandoned, which is a continuation-in-part of Ser. No. 321,518, Oct. 12, 1994, abandoned.

[51] Int. Cl.$^6$ .................................................. F16D 3/54
[52] U.S. Cl. ........................... 464/88; 464/154; 464/901
[58] Field of Search .............................. 464/73, 74, 75, 464/76, 87, 88, 149, 153, 154, 173, 901

[56] References Cited

U.S. PATENT DOCUMENTS

| | | |
|---|---|---|
| 1,328,366 | 1/1920 | Brown. |
| 1,622,101 | 3/1927 | Francke. |
| 1,952,232 | 3/1934 | Axien. |
| 2,213,277 | 9/1940 | Guy. |
| 2,301,659 | 11/1942 | Ricefield. |
| 2,337,287 | 12/1943 | Williams. |
| 2,343,839 | 3/1944 | Austin. |
| 2,502,790 | 4/1950 | Jenick. |
| 2,629,991 | 3/1953 | Guy. |
| 2,655,798 | 10/1953 | Neher. |
| 2,740,271 | 4/1956 | Beler. |
| 2,859,599 | 11/1958 | Case ............................ 464/154 X |
| 2,866,103 | 1/1958 | Williams. |
| 2,867,102 | 1/1959 | Williams. |
| 2,924,082 | 2/1960 | Reich. |
| 3,313,124 | 4/1967 | Fileep. |
| 3,362,191 | 1/1968 | Louette ............................ 464/88 X |

(List continued on next page.)

FOREIGN PATENT DOCUMENTS

| | | |
|---|---|---|
| 1325728 | 1/1994 | Canada. |
| 839967 | 1/1907 | France. |
| 2678033 | 12/1992 | France ........................ 464/73 |
| 1046417 | 2/1958 | Germany. |
| 2042260 | 3/1972 | Germany. |
| 97473 | 5/1973 | Germany. |
| 12610 | 5/1933 | United Kingdom. |
| 459909 | 1/1937 | United Kingdom. |

OTHER PUBLICATIONS

Formsprag, Elastomeric Couplings, Hi Missalignment Capacity Overload Protection, PTS–093–90, no date available.

Applicant's Atra–Flex catalog showing prior art couplings, no date available.

Hub Photographs, no date available.

Catalog titled, Mechanical Power Transmission Equipment, T. B. Woods Sons Company (1982).

Letter dated Dec. 11, 1996, from Smart & Biggar to the Canadian Commissioner of Patents.

Primary Examiner—Eileen A. Dunn
Attorney, Agent, or Firm—Price, Gess & Ubell

[57] ABSTRACT

A flexible coupling of the type having hubs secured to aligned shafts and connected to one another through the use of a flexible belt surrounding the hubs is improved by forming axial and circumferential grooves on the exterior surface of the belt, each circumferential groove lying transverse to and opening into an axial groove. A cooperating metal retainer ring has respective pins formed on its interior surface for insertion into the axial grooves. After a test for gross misalignment has been satisfied, the respective pins are rotated into the circumferential grooves, thereby fixing the retainer ring in position with respect to the flexible belt and coupling. The belt further has nine wedge-shaped projections, each conformably fitting with a receptacle in a cooperating hub, each receptacle rotatable into a position where it lies vertically above the shaft on which the hub is mounted, each receptacle further providing inside diameter support to the belt through its mating relationship therewith.

30 Claims, 5 Drawing Sheets

U.S. PATENT DOCUMENTS

| | | |
|---|---|---|
| 3,410,112 | 11/1968 | Gawreliuk . |
| 3,636,729 | 1/1972 | Patel .................................. 464/76 |
| 3,729,953 | 5/1973 | Warzer . |
| 3,732,706 | 5/1973 | Evans . |
| 3,834,182 | 9/1974 | Trask et al. . |
| 4,176,815 | 12/1979 | Davidson et al. ................ 403/349 X |
| 4,357,137 | 11/1982 | Brown ................................... 464/75 |
| 4,373,925 | 2/1983 | Fickelscher . |
| 4,662,859 | 5/1987 | Saki et al. . |
| 4,969,371 | 11/1990 | Allen ................................. 464/154 X |
| 5,139,460 | 8/1992 | Hoyt, III et al. . |
| 5,186,197 | 2/1993 | Lavine ............................... 403/349 X |
| 5,295,911 | 3/1994 | Hoyt, III et al. . |

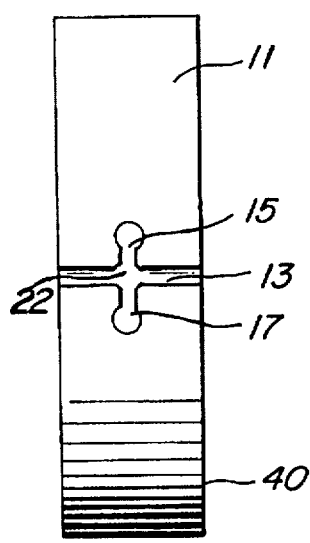
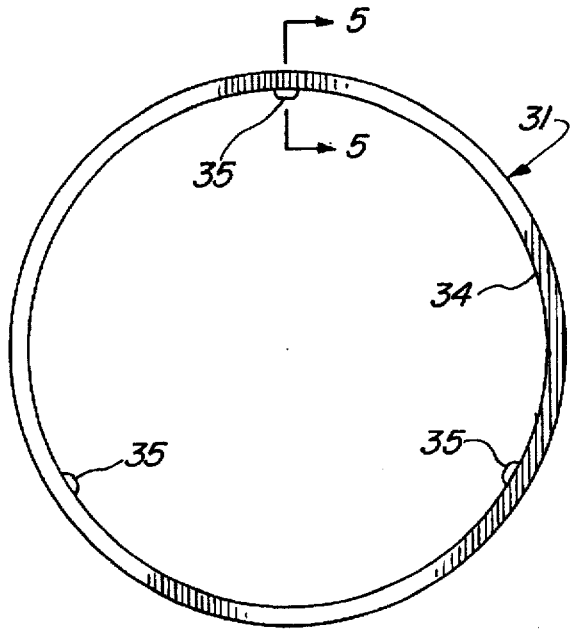
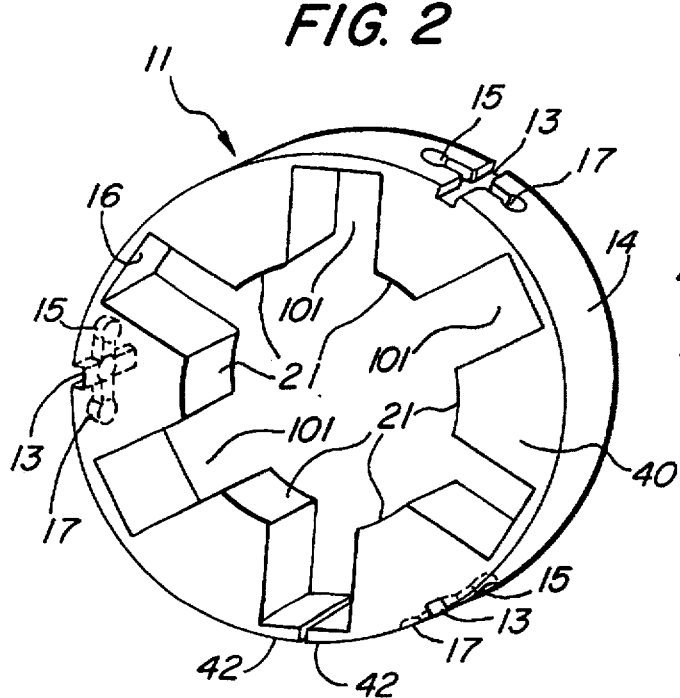
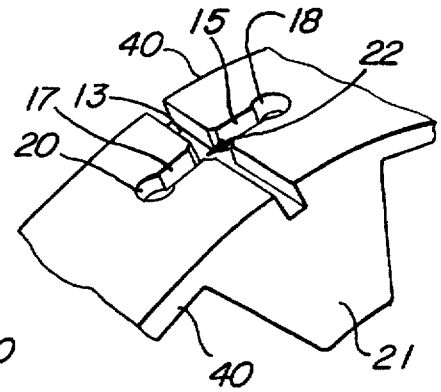
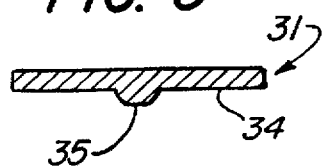

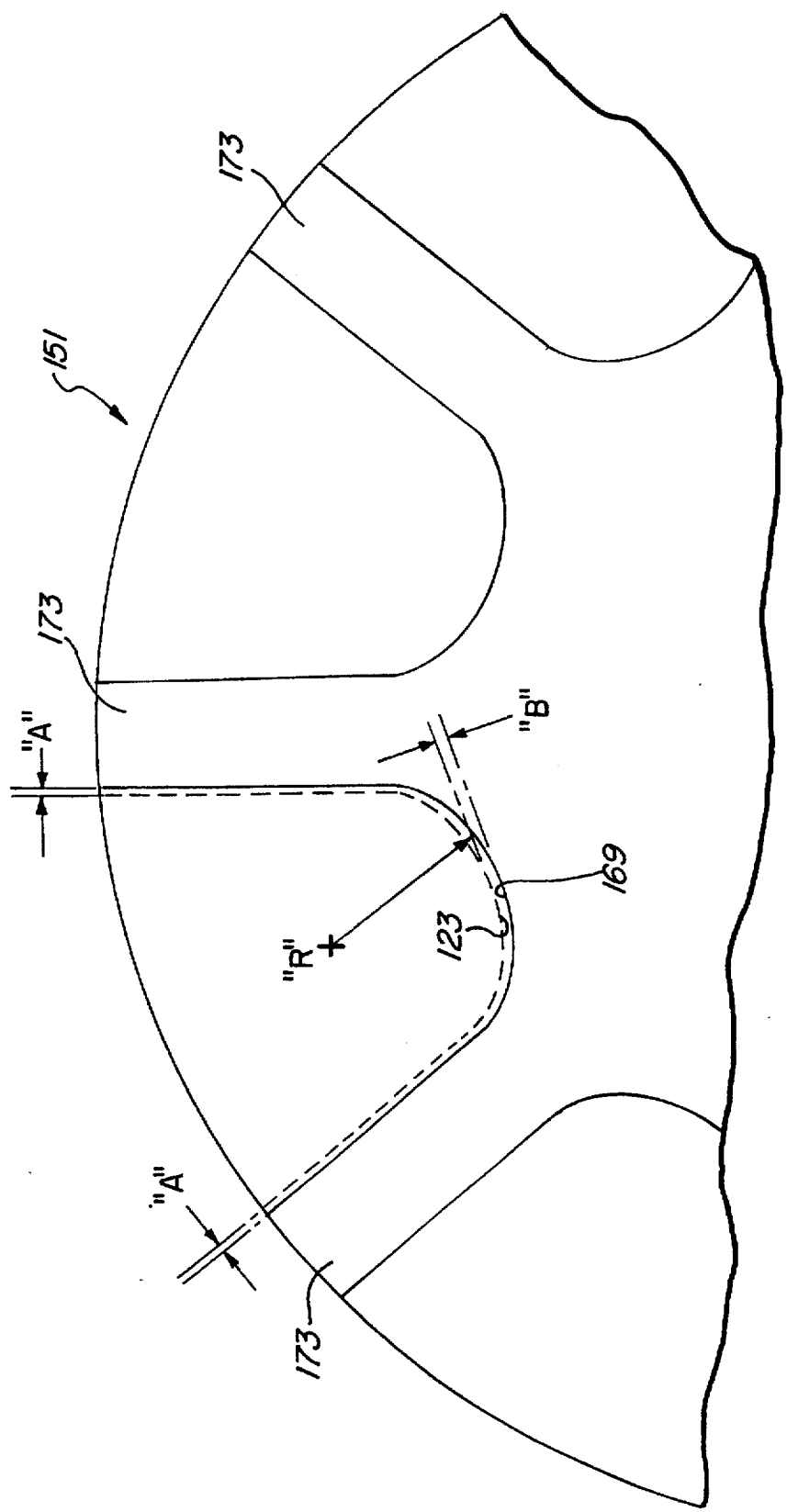

COMPACT FLEXIBLE COUPLINGS WITH INSIDE DIAMETER BELT SUPPORT AND LOCK-ON FEATURES

This is a continuation of application Ser. No. 08/340,528, filed Nov. 16, 1994 now abandoned, which application is a continuation-in-part of application Ser. No. 08/321,518, filed Oct. 12, 1994 now abandoned.

BACKGROUND OF THE INVENTION

1. Field of the Invention

The invention set forth in this specification pertains to new and improved flexible couplings and, more particularly, to such couplings having a walk-off, gross misalignment detection and lock-on feature in combination with a more compact and efficient cooperating flexible belt and hub structure providing inside diameter support for the flexible belt.

2. Description of Related Art

Flexible couplings have probably been used since shortly after the advent of the modern machine age for the purpose of transmitting rotation from one shaft to another. Such couplings are normally used in order to accommodate comparatively minor shaft alignment problems such as are occasionally encountered because of manufacturing or assembly errors. Because of the fact that these devices are widely used and have been known and used for many years, many different types of flexible couplings have been proposed, built, and used.

The particular flexible couplings of the type to which this invention pertains have been manufactured in the past so as to include two hubs or hub elements which are adapted to be connected to the shafts joined by the coupling. These hubs are each provided with extending lugs, teeth, or ribs serving as holding means so as to be engaged by corresponding projections on a band-like or belt-like motion transmitting means in order to cause the hubs to rotate in synchronism as one of the shafts is rotated. The bands or belts used in these prior couplings have been flexible, somewhat resilient belts capable of being wrapped around the hubs so that the projections on them engage the holding means on the hubs.

A metal band or ring is typically used to retain the belt in position wrapped around the hubs. The interior of the band is shaped and dimensioned so that the band may be slid axially relative to the hubs during the assembly and disassembly of the coupling so that the band fits over the belt when the coupling is assembled so as to conform closely to the exterior of the belt.

Some coupling designs have provided a pair of oppositely-disposed axial grooves in the outer surface of the belt and a pair of oppositely-disposed pins in the inner surface of the metal band. The pins are located so as to slide into the grooves as the metal band is installed along a line parallel to the axis of rotation of the hubs. The pins thus position the band and provide a degree of retention. However, if the shafts are grossly misaligned, the metal band will "walk-off" the belt, causing the coupling to come apart. The axial grooves have also been provided with an enlarged central portion such that the pins must be forced through the entrance of the axial groove and then "pop" into place in the central portion to give a tactile indication that the metal band is properly positioned with respect to the flexible belt.

OBJECTS AND SUMMARY OF THE INVENTION

The inventors have conceived of a new and improved coupling design and installation method featuring a two-step installation procedure. The procedure utilizes a flexible coupling belt provided with axial grooves and, additionally, with circumferential grooves oriented transverse or perpendicular to the axial grooves. With this structure, a cooperating metal retainer ring is first installed on the flexible belt with a cooperating pin or pins lying in the axial groove or grooves. The coupling is then rotated under operating conditions to determine if there is gross misalignment; i.e., if the ring rotates off the belt. If not, the ring is rotated such that the pins become located or positioned in the transverse circumferential groove, thus fixing the ring in position such that it cannot slide axially with respect to the belt.

The coupling belt and ring with axial/circumferential groove structures may be usefully combined in a novel coupling structure wherein the flexible belt is provided with wedge-shaped projections terminating in rounded ends which closely mate with wedge-shaped receptacles defined by spokes in a hub structure, the receptacles being positioned to lie over the shafts on which such hubs are mounted. The hub structure particularly provides a means for providing inside diameter support for the flexible belt. Overall, the coupling structure is considerably more compact and efficient than previously-known structures.

BRIEF DESCRIPTION OF THE DRAWINGS

The just-summarized invention will now be more fully explained with reference to the accompanying drawings, of which:

FIG. 1 is a front view of a flexible coupling belt in accordance with the preferred embodiment;

FIG. 2 is a side perspective view of the flexible belt of FIG. 1;

FIG. 3 is a partial perspective view of a segment of the belt of FIG. 1;

FIG. 4 is a side view of a ring for cooperative installation with the belt of FIGS. 1–3, according to the preferred embodiment;

FIG. 5 is a cross-sectional view taken at 5—5 of FIG. 4;

FIG. 13 is a partial schematic view of a portion of a flexible belt and cooperating hub receptacle according to an illustrative embodiment.

Figure 6:
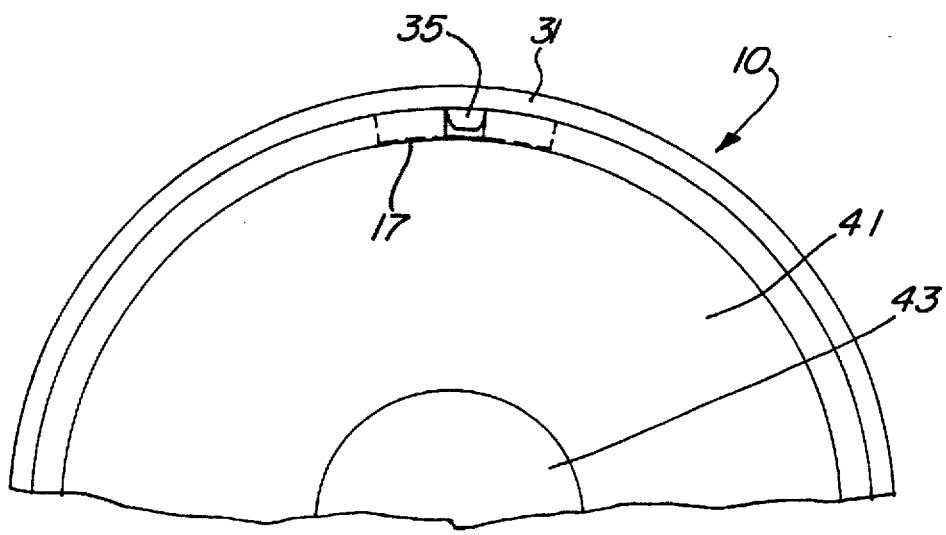
FIGS. 6 and 7 are partial side views of a flexible coupling illustrating the manner of installing a retainer ring and flexible belt thereon, according to the preferred embodiment.

The particular couplings illustrated in the accompanying drawings are constructed so as to embody the concepts and teachings of this invention summarized and defined in the appended claims. Since these concepts and features may be utilized in a variety of somewhat differently appearing flexible couplings through the use of ordinary mechanical engineering skill on the basis of the disclosure embodied in this specification and the accompanying drawings, the invention is not to be considered as being limited to the precise structures illustrated in the drawings and described herein.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a cooperating coupling belt and ring structure, as well as an overall coupling structure, which is particularly effective in operation, as well as readily manufactured and installed.

FIGS. 1–3 illustrate a flexible belt 11 according to the preferred embodiment. This belt 11 is preferably formed out of a somewhat flexible, somewhat resilient material capable of transmitting a significant rotational force from one hub of a flexible coupling to the other during the use of the coupling. Presently preferred results are achieved by forming the belt 11 out of an appropriate polyurethane having the rotational force transmitting properties indicated. It has been found that a urethane material is particularly desirable because it will give or flex sufficiently to accommodate minor misalignment of rotating shafts without affecting its ability to be utilized over a long period.

As formed, the belt 11 has a generally cylindrical exterior or outer surface 14, an interior 16, sides or side edges 40, and ends 42 (FIG. 2). The belt 11 will normally be just sufficiently long so that the ends 11 will not quite meet when the belt 11 is located around a pair of hubs, e.g. 41 (FIG. 6). When the belt 11 is in this position, truncated wedge-shaped projections 21 on its interior 16 extend between cooperating teeth on the hubs, e.g. 41, so as to fit closely with respect to all of the teeth, as known in the art. The projections 21 can be considered as defined by interior opening, eg. 101 and as interior engagement means on the belt 11 which are employed for the purpose of engaging the hub teeth so as to transmit rotation from one of the hubs to the other of the hubs.

The belt 11 further has axially-disposed grooves or channels 13 in its exterior or outer surface 14. The illustrated embodiment has three such grooves 13 located at equal intervals around the circumference of the exterior surface 14 of the belt 11, i.e. 120 degrees apart.

At the center of the belt 11, the side of each channel or groove 13 is provided with a respective circumferential groove, channel, or notch 15, 17, each positioned perpendicular to and opening into groove 13. The grooves 13, 15, 17 are all preferably rectangular in cross-section and have a common flat floor; i.e., they are of the same depth. The grooves 13, 15, 17 are all further of a width which permits them to slidingly receive respective pins 35 of a cooperating metal ring 31 illustrated in FIGS. 4 and 5.

Figure 7:
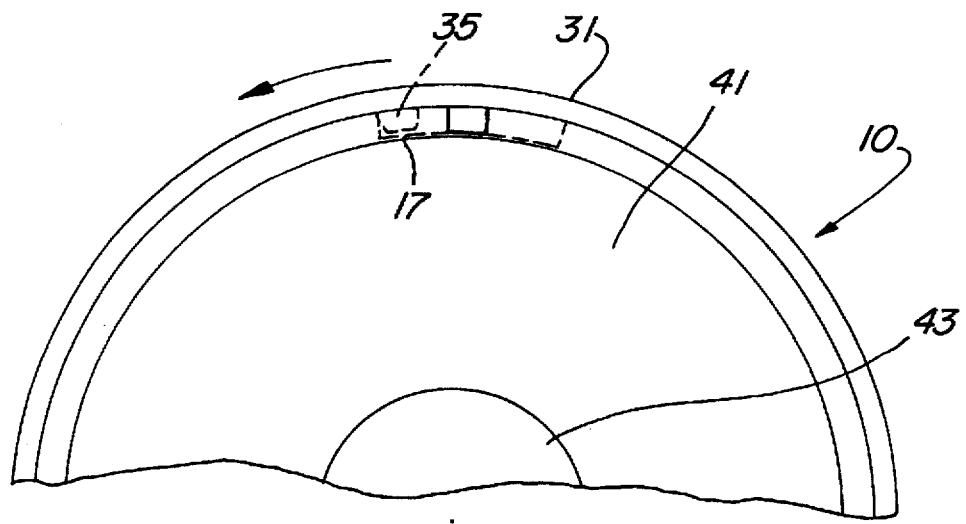

As those skilled in the art will appreciate, the metal band 31 is used to retain the flexible belt 11. The interior 34 of the band 31, as well as the pins 35 located thereon, are shaped and dimensioned so that the band 31 may be slid axially relative to the hubs, such as hub 41, during the assembly and disassembly of the coupling 10 so that the band 31 fits over the belt 11, as shown, so as to conform closely to the exterior 14 of the belt 11 when the belt 11 is installed as illustrated in FIGS. 6 and 7. The pins 35 are centered on the interior surface 34 of the metal band 31 and equally spaced apart about the circumference of this interior surface 34 at intervals of 120 degrees.

Each circumferential groove 15, 17 terminates in an end receptacle 18, 20. The end receptacle 18, 20 is somewhat wider than the entrance pathway to it. Similarly, the central portion 22 at the intersection of the axial groove 13 with the circumferential grooves 15, 17 is somewhat larger than the entrance pathways to the central portion 22 provided in the channel 13 and also somewhat larger than the entrance pathways of the respective grooves 15, 17. Central portion 22 thereby forms a third receptacle.

As indicated in FIG. 1, for example, each of the receptacle portions 18, 20, 22 may be generally contoured in cross-section to match an identical circle.

The entrance pathways to the receptacle portions 18, 20, 22 are preferably slightly narrower in width than the width of the pins 35 such that one feels resistance as the band 31 is forced onto the belt 11. The receptacles 18, 20, 22 (and, hence, the "circle" in FIG. 1) are dimensioned slightly larger to receive and hold one of the pins 35 of the metal band 31, such that one feels the resistance cease as the pins 35 pop into place in any of the receptacle portions 18, 20, 22. Since the pins 35 are not visible during installation, such structure and operation provides a tactile indication of proper positioning of the pins 35.

Representative dimensioning for an entranceway is 0.154 inch for a pin width of 0.184 inch and a receptacle diameter of 0.185 inch. Such dimensioning may, of course, vary, for example, as the size of the coupling, ring, and belt vary.

As known in the art, flexible couplings 10 are normally utilized to mechanically connect two aligned or substantially aligned shafts, e.g., 43 (FIGS. 6, 7). The couplings 10 include two separate, identical cylindrical hubs, e.g. 41. Such hubs are typically provided with centrally-located shaft openings which accommodate respective shafts, e.g. 43. Such hubs may be secured to the shafts through the use of conventional set screws or in other conventional manners well-known in the field. Normally, the precise methods of securing the hubs to the shafts will be dependent upon the size of the coupling and the sizes of the shaft with which it is to be used. If desired, the two openings in the two hubs may differ in dimension so as to accommodate shafts of a different dimension.

When the hubs are mounted they are desirably either in axial alignment or are nearly in axial alignment, and they are located on their respective shafts so that projecting teeth or lugs located on their adjacent ends extend generally towards one another. These teeth will normally be spaced a short distance axially from one another so as to avoid their periodically abutting against one another in the event the respective shafts are not in precise alignment.

During installation of the coupling 10, the teeth on the adjacent ends of the hubs will be brought into alignment with one another, as known in the art, through the rotation of one or the other of the shafts as a belt 11 serving as a motion transmitting means is assembled on the hubs, e.g. 41.

According to the preferred embodiment, a two-step procedure is then used to install the metal band 31 on the belt 11 and, hence, on the coupling 10. First, the band 31 is positioned adjacent the belt 11 with each pin 35 aligned with a respective axial groove 13. The band 31 is then forced onto the belt 11, thereby locating each pin 35 in the receptacle portion 22 of its respective groove 13, as illustrated in FIG. 6. The coupling 10 is then rotated by supplying driving power to a selected shaft 43. While the coupling 10 is operating, e.g. at normal speed, it is observed to determine whether the band 31 will slide or "walk" off the belt 11. If so, there is an indication that the respective coupling shafts are grossly misaligned, and the shafts may then be properly aligned until the metal band 31 does not walk off.

After proper shaft alignment, the metal band 31 is then rotated, counterclockwise in FIG. 6, about the shaft axis so as to position each pin 31 in the receptacle, e.g., 20 of a respective transverse circumferential groove, e.g., 17, thereby fixing the metal band 31 in position on the flexible belt 11. Alternatively, the metal band 31 can be rotated clockwise such that each pin 31 is located in the receptacle 18 of the opposite circumferential groove 15.

An improved flexible coupling structure particularly useful with a belt and ring featuring the just-described walk-off detect and lock-on feature is disclosed in FIGS. 8–13. Conventional flexible coupling belts employ truncated wedge-shaped projections 21 as shown in FIG. 2. The truncated ends are exposed in the interior of the coupling between the mating teeth. According to the improved embodiment of FIGS. 8–13, the wedge-shaped projections 121 of flexible belt 140 are not truncated to terminate in flat ends, but rather are extended to terminate in rounded ends 123.

Figure 9:
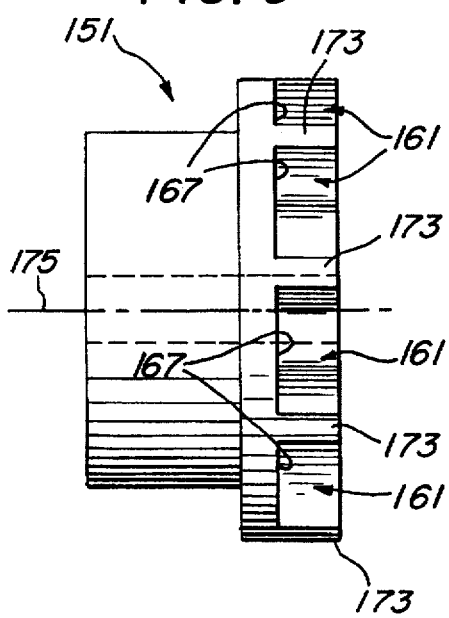
FIG. 9 is a front view of a hub which forms part of the improved flexible coupling of the preferred embodiment.
Figure 10:
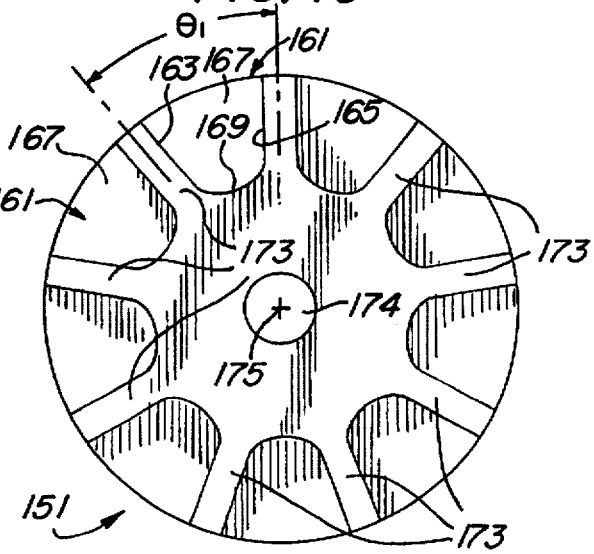
FIG. 10 is a side view of the hub of FIG. 9.

The cooperating mating hub 151 of FIGS. 9 and 10 is further provided with a mating receptacle 161 for each projection 121. Each receptacle 161 is defined by a flat back surface 167, and has first and second sides 163, 165 angled to define a wedge-shaped opening which terminates in a rounded floor surface 169. The sides 163, 165 and back surface 167 of each receptacle 161 are dimensioned to mate with and closely conform to the shape of a respective wedge-shaped projection 121. Respective pairs of sides 163, 165 define a plurality of spokes 173 radially-disposed about the hub axis 175 and equally spaced at 40-degree intervals (e.g., $\theta_1$, FIG. 10) from one another. With the hub axis 175 lying horizontally, the back surfaces 167 all lie in the same vertical plane, which cuts or bisects the central bore 174 of the hub 151.

Figure 11:
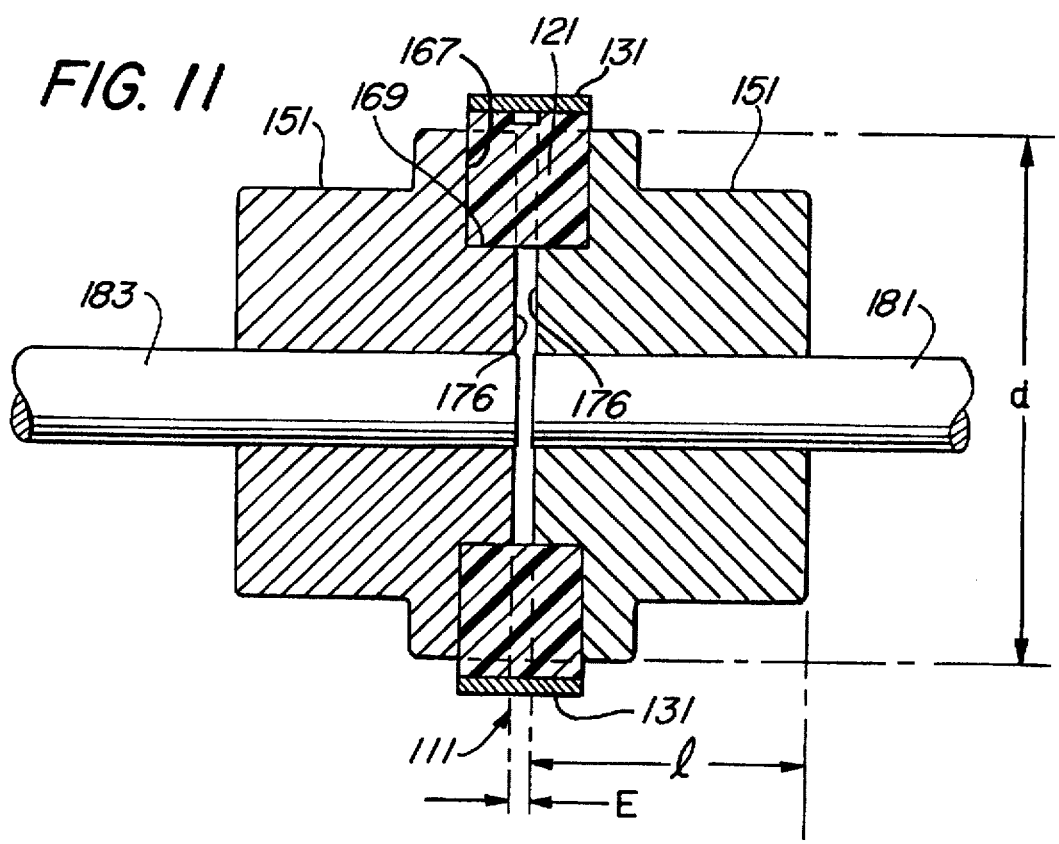
FIG. 11 is a cross-sectional view of a flexible coupling according to the preferred embodiment.
Figure 12:
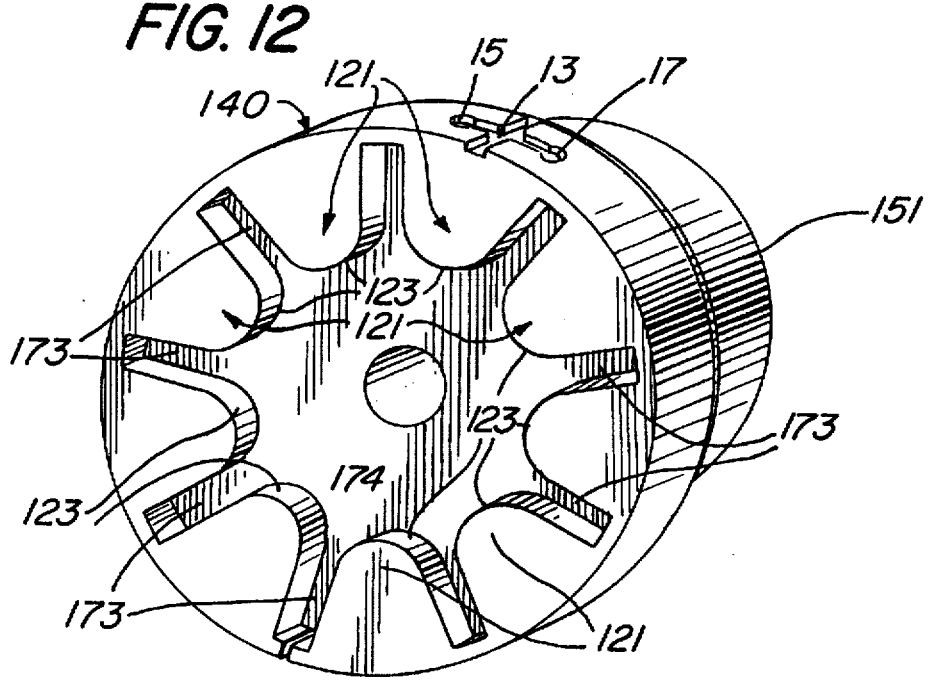
FIG. 12 is a perspective view illustrating a belt mounted on a hub according to the preferred embodiment.

The receptacles 161 are further positioned such that, as the hub 151 rotates about a horizontal axis 175, each receptacle 161 comes into a position wherein it lies vertically over the shaft 183 on which the hub 151 is mounted. Thus, as shown in FIG. 11, the respective shafts 181, 183 terminate beneath the receptacles 161 instead of at the beginning of projecting teeth positioned to mate with truncated wedge-shaped projections such as shown in FIG. 1. This design provides a shortened unit of reduced weight, and thus conserves space and weight. The resulting coupling is thus more compact and provides a more direct transfer of torque into the sheer load.

As shown in FIG. 11, in the assembled coupling, the faces 176 of the respective hubs 151 are spaced apart by a distance "E" selected to accommodate the desired degree of minor angular misalignment. By way of example, for a hub 151 having a diameter "d" of 23.9 inches and a length '1' of 13 inches, the distance E may be on the order of 250/1000-inch, accommodating a one-degree angular misalignment. Various spacings "E" will be dictated by coupling size and desired angular misalignment tolerance.

FIG. 13 illustrates an example of the relative fit between a rounded belt projection 121 and the mating hub receptacle 161. The spacing "A" between the sides 163, 165 of the receptacle 161 and the respective sides of the projection 121 may be, for example, 0.0625-inch. The spacing "B" between the end 123 of projection 121 and the mating floor surface 169 may be 0.1272-inch for a radius "R" of 2.6863 inches such that each rounded end 123 and its correspondingly rounded mating floor surface 169 lie immediately adjacent one another. Such spacings are provided to accommodate tolerances and various factors such as thermal expansion.

When the retainer ring 131 is installed, the rounded ends 123 of the belt 140 are pressed firmly into their mating receptacles 161. The mating between the rounded ends 123 of projections 121 and the floor surfaces 169 of the receptacles 167 in the preferred embodiment then provides internal support for the flexible belt 140, which complements the outside diameter support provided by the retainer ring 131. Since the tip of each rounded end surface 123 lies on a common diameter, the internal support to the flexible belt 140 of the preferred embodiment may be termed inside diameter support. Such a second means of support provides a substantial improvement and contributes to the significant overall improvement in the performance of the preferred embodiment. Various embodiments wherein the tips of the end surfaces 167 do not lie on a common diameter can be made, but are not presently preferred.

Figure 8:
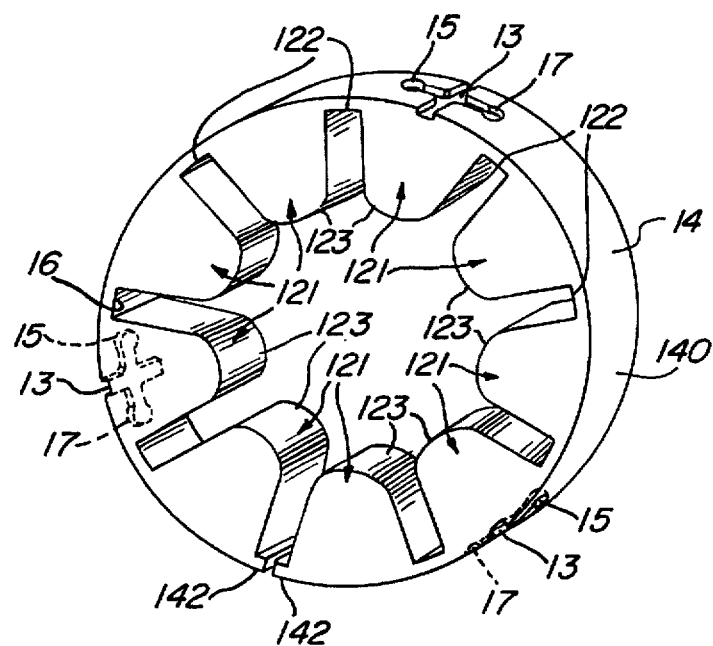
FIG. 8 is a side perspective view of a flexible belt which forms part of the improved flexible coupling of the preferred embodiment.

As depicted in the figures, the flexible belt 140 is further provided with nine wedge-shaped projections 121. The nine projections 121 provide a particularly desirable interaction with a walk-off detect and lock-on groove structure, as shown in FIGS. 1–7. Provision of nine projections 121 enables the desirable 120-degree spacing of axial grooves, as shown in FIG. 8, wherein each groove lies over a thick wedge-shaped projection 121 as opposed to the thinner web portion 122 interconnecting the projections 121. Placing the locking mechanism in such manner provides increased strength to the locking mechanism with the stability of three pins 135 at 120-degree spacings from one another around the belt 140. Additionally, a nine-projection belt 140 provides increased torque transfer over, for example, eight-projection belts. The overall combination of FIGS. 8–13 thus provides improved strength and performance in a more compact structure, together with a walk-off detect, lock-on feature.

The hubs 151 are each a unitary metal piece, preferably steel, which is preferably machined to shape by a CNC automatic milling machine. The belt 140 is preferably a selected polyurethane and is installed by wrapping it around the previously installed hubs 151, and thereafter installing the metal retainer ring 131, preferably using the walk-off detect, lock-on procedure described above.

Those skilled in the art will appreciate that various adaptations and modifications of the just-described preferred embodiment can be configured without departing from the scope and spirit of the invention. For example, while receptacles 18, 20, 22 have been particularly disclosed in the preferred embodiment to enhance installation and provide tactile sizing of the relative band/belt position, such receptacle portions could be modified or omitted in other embodiments. The number of axial and cooperating circumferential grooves may also be varied. Various diameter or "sizes" of hubs and belts may be provided for various applications with various specific dimensioning for a selected application. Therefore, it is to be understood that, within the scope of the appended claims, the invention may be practiced other than as specifically described herein.

What is claimed is:

1. Flexible coupling apparatus comprising:
   a split, flexible belt having a plurality of projections thereon, each projection having first and second sides and terminating in a rounded end;
   a pair of hubs, each having a plurality of receptacle means, each receptacle means for receiving a respective corresponding one of said plurality of projections, each receptacle means conforming generally to the shape of its corresponding projection and having a rounded floor portion lying adjacent the corresponding rounded end, each said hub further having a central axis and a central bore formed about said axis for receiving a mounting shaft;

an endless metal retainer band means for holding said belt in place about said pair of hubs; and wherein each said rounded floor portion has a flat inner wall at an inner end thereof, each flat inner wall lying in a first plane and each rounded floor portion further being bounded at an outer end thereof by a second plane parallel to said first plane, said first plane intersecting and lying perpendicular to said bore, said second plane defining the end of said bore.

2. The coupling apparatus of claim 1 wherein said metal retainer band means has a pin located on an interior surface thereof and further comprising:

at least one axial groove means formed in the outer surface of said belt for receiving and permitting passage of said pin upon axial application of said retainer band means about said belt; and at least one circumferential groove means formed in the outer surface of said belt perpendicular to said axial groove means and opening into said axial groove means for receiving, permitting passage of, and retaining said pin upon circumferential rotation of said retainer band means with respect to said belt.

3. The flexible coupling apparatus of claim 2 further including a second circumferential groove opening into said axial groove means and disposed opposite said at least one circumferential groove means.

4. The flexible coupling apparatus of claim 2 wherein said at least one axial groove, means includes an entrance pathway portion and a receptacle portion.

5. The flexible coupling apparatus of claim 4 wherein said entrance pathway portion is dimensioned to provide resistance to insertion of said pin therein and said receptacle portion is dimensioned to reduce said resistance, thereby providing a tactile sense of insertion of said pin in said receptacle portion.

6. The flexible coupling apparatus of claim 2, wherein said retainer band means has three equally circumferentially spaced pins and said belt has three said axial groove means positioned and dimensioned for receiving a respective one of said pins and at least one said circumferential groove means opening into a respective one of the three said axial groove means.

7. The flexible coupling apparatus of claim 6 wherein each said axial groove means is equally spaced from the next about the circumference of the belt such that the three said axial grooves means lie 120 degrees apart from one another.

8. The flexible coupling apparatus of claim 1 wherein said flexible belt further comprises an outer surface comprising the outer surface of a right circular cylinder and wherein said split comprises an axial split defining first and second ends of said belt.

9. The flexible coupling apparatus of claim 1 wherein said plurality of receptacle means are defined by an array of radial spokes.

10. The flexible coupling apparatus of claim 9 wherein the number of said receptacle means and the number of said projections is nine.

11. Flexible coupling apparatus comprising:

a split, flexible belt having an outer circumferential surface, an interior, and a plurality of openings defining a plurality of projections thereon, each projection having a pair of sides and terminating in a rounded end located in the interior of said belt;

an endless metal retainer band means mountable around and adjacent to the outer circumferential surface of said flexible belt for providing support to said belt about the outer circumferential surface thereof;

a pair of hubs, each having a plurality of receptacle means for receiving a respective one of said plurality of said projections and the rounded end thereof and for providing support to said rounded ends of said wedge-shaped projections of said flexible belt; and wherein each said hub hag a central axis and a central bore for receiving a mounting shaft, each receptacle means having a floor portion located to come into a position where it lies vertically above said bore when the hub is rotated with respect to said shaft.

12. The flexible coupling apparatus of claim 11 wherein each said rounded end includes a radiused portion which lies tangential to a circle having a diameter, said circle defining the inside diameter of said belt such that said receptacle means provide support to said belt along the inside diameter of said belt, the support provided by said receptacle means thereby comprising inside diameter support.

13. The flexible coupling apparatus of claim 11 wherein said flexible belt further comprises an outer surface comprising the outer surface of a right circular cylinder and wherein said split comprises an axial split defining first and second ends of said belt.

14. The flexible coupling apparatus of claim 11 wherein each receptacle means has a rear wall, each rear wall lying in a vertical plane perpendicularly intersecting said bore.

15. The flexible coupling apparatus of claim 14 wherein each receptacle means includes a rounded floor surface for conformably mating with a respective rounded end.

16. The flexible coupling apparatus of claim 15 wherein the number of projections and number of receptacle means is nine.

17. The coupling apparatus of claim 11 wherein each said rounded floor portion has a flat inner wall at an inner end thereof, each flat inner wall lying in a first plane and each rounded floor portion further being bounded at an outer end thereof by a second plane parallel to said first plane, said first plane intersecting and lying perpendicular to said bore, said second plane defining the end of said bore.

18. The coupling apparatus of claim 11 wherein said metal retainer band means has a pin located on an interior surface thereof and further comprising:

at least one axial groove means formed in the outer surface of said belt for receiving and permitting passage of said pin upon axial application of said retainer band means about said belt; and at least one circumferential groove means formed in the outer surface of said belt perpendicular to said axial groove means and opening into said axial groove means for receiving, permitting passage of, and retaining said pin upon circumferential rotation of said retainer band means with respect to said belt.

19. The flexible coupling apparatus of claim 18 wherein said at least one axial groove means includes an entrance pathway portion and a receptacle portion.

20. The flexible coupling apparatus of claim 19 wherein said entrance pathway portion is dimensioned to provide resistance to insertion of said pin therein and said receptacle portion is dimensioned to reduce said resistance, thereby providing a tactile sense of insertion of said pin to one inserting said pin in said receptacle portion.

21. The flexible coupling apparatus of claim 18 further including a second circumferential groove opening into said axial groove means and disposed opposite said at least one circumferential groove means.

22. The flexible coupling apparatus of claim 18, wherein said retainer band means has three equally circumferentially spaced pins and said belt has three said axial groove means positioned and dimensioned for receiving a respective one of said pins and at least one said circumferential groove means opening into one of the three said axial groove means.

23. The flexible coupling apparatus of claim 22 wherein each said axial groove means is equally spaced from the next about the circumference of the belt 120 degrees apart.

24. The flexible coupling apparatus of claim 11 wherein said receptacle means are defined by an array of radial spokes.

25. The flexible coupling apparatus of claim 24 wherein the number of said receptacle means and the number of said projections is nine and each said pin is disposed over a respective said projection.

26. The flexible coupling apparatus comprising:

a split, flexible belt formed of a urethane material and having at least four wedge-shaped projections thereon, each wedge-shaped projection having a rounded end;

a pair of hubs, each having a first cylindrical portion having a first diameter and a second cylindrical portion having a second diameter and formed unitarily with said first cylindrical portion said second diameter being greater than said first diameter;

a central bore extending horizontally through both said first and second cylindrical portions of each said hub;

each said second cylindrical portion having at least four receptacles, each for receiving a respective said projection, each receptacle having first and second flat rectangular radial sides forming into a symmetrically rounded floor portion, the first and second flat radial sides and the rounded floor portion of each receptacle meeting with and being integrally and unitarily formed with a flat metal back surface lying in a vertical plane with respect to said central bore;

each projection being of a shape conforming to that of a respective said receptacle and being gapped away from said sides by 0.0625 inch and by 0.127 inch from said floor portion; and an endless retainer band means for holding said belt in place about said hubs.

27. The coupling apparatus of claim 26 wherein said retainer band means has a pin located on an interior surface thereof and further comprising:

at least one axial groove formed in an outer surface of said belt for receiving and dimensioned to permit passage of said pin upon axial application of said retainer band means about said belt; and at least one circumferential groove formed in the outer surface of said belt perpendicular to said axial groove and opening into said axial groove and dimensioned to receive, permit passage of, and retain said pin upon circumferential rotation of said retainer band means with respect to said belt.

28. The flexible coupling apparatus comprising:

a split, flexible belt formed of a plastic material and having at least four wedge-shaped projections thereon, each wedge-shaped projection having a rounded end;

a pair of hubs, each having a cylindrical portion;

a central bore extending horizontally through the cylindrical portion of each of said hubs;

each said cylindrical portion having at least four receptacles, each for receiving a respective said projection, each receptacle having first and second flat rectangular radial sides forming into a symmetrically rounded floor portion, the first and second flat radial sides and the rounded floor portion of each receptacle meeting with and being integrally and unitarily formed with a flat metal back surface, said back surface lying in a plane which is vertical with respect to said central bore;

each projection being of a shape conforming to that of a respective said receptacle and being gapped away from said first and second sides by a first constant distance and gapped from said floor portion by a second constant distance; and an endless metal retainer band means for holding said belt in place about said hubs.

29. The coupling apparatus of claim 28 wherein said metal retainer band means has a pin located on an interior surface thereof and further comprising:

at least one axial groove means formed in an outer surface of said belt for receiving, and dimensioned to permit passage of, said pin upon axial application of said retainer band means about said belt; and at least one circumferential groove formed in the outer surface of said belt perpendicular to said axial groove means and opening into said axial groove means and dimensioned to receive, permit passage of, and retain said pin upon circumferential rotation of said retainer band means with respect to said belt.

30. The coupling apparatus of claim 28 wherein each projection has first and second parallel planar sidewalls so positioned with respect to one another that each first sidewall abuts and lies flush against a respective radial side of one of said hubs while each second sidewall lies flush against a radial side of the other of said hubs.

* * * * *